United States Patent [19]

Ciaccio

[11] 4,212,761

[45] Jul. 15, 1980

[54] METHOD AND COMPOSITION FOR CLEANING DAIRY EQUIPMENT

[75] Inventor: Leonard L. Ciaccio, Glen Rock, N.J.

[73] Assignee: Novo Laboratories, Inc., Wilton, Conn.

[21] Appl. No.: 883,404

[22] Filed: Mar. 6, 1978

[51] Int. Cl.$^2$ .................. C11D 7/42; C11D 3/386
[52] U.S. Cl. .................. 252/174.12; 252/DIG. 12; 252/135; 252/156
[58] Field of Search ......... 252/156, 135, 89, DIG. 12; 195/63, 68; 282/174.12

[56] References Cited

U.S. PATENT DOCUMENTS

| | | | |
|---|---|---|---|
| 3,519,570 | 7/1970 | McCarty | 195/63 |
| 4,081,395 | 3/1978 | Talley | 252/156 |

Primary Examiner—Mayer Weinblatt
Attorney, Agent, or Firm—Fidelman, Wolffe & Waldron

[57] ABSTRACT

A composition for cleaning of dairy equipment comprising detergent, a mixture of sodium carbonate and sodium bicarbonate in a ratio of 1:5 to 3:1, and as from 1 to 100% w/w of the carbonates, an alkaline proteinase based upon a proteolytic activity of 1.5 Anson units per gram. Less proteinase may be employed but cleaning efficiency decreases substantially when the enzyme content is less than about 1%.

A dairy cleaning solution containing the composition as 0.1–0.5% w/v in water exhibits pH 8.5–11. In hard water areas sodium tripoly phosphate may be included in the composition, being up to 0.125% w/v in the dairy cleaning solution. The carbonate content of the cleaning solution is from 0.05–0.25% w/v.

The method involves passing a solution at about pH 8.5–11 of the composition through the dairy equipment at a solution temperature of ambient to 55° C.

5 Claims, No Drawings

METHOD AND COMPOSITION FOR CLEANING DAIRY EQUIPMENT

BACKGROUND OF THE INVENTION

This invention relates to a method and composition for cleaning of dairy equipment and briefly involves the adaptation of enzymatic dissolution of milk stone and other dairy deposits to the problems of maintaining dairy cleanliness.

The high nutritive value of milk has created enormous cleanliness and sterility problems for the dairy industry. To prevent microbial contamination, heat sterilization has become the prevalent method for maintaining wholesome the milk consumed in the United States. Yet, even high temperature short time (HTST) contact between milk and heated surfaces causes deposition of milk stone, which deposits interfere with heat exchange, and in addition, provides a locale for bacterial growth. As a consequence, dairy equipment, notably the sterilizers, are customarily cleaned at least once a day.

One cleaning technique, heretofore used widely, particularly for the CIP (cleaning in place) method, involves flushing the sterilizing equipment in alternation with a highly alkaline non-foaming detergent formulation and with a highly acidic phosphoric acid wash. During this cleaning cycle, the sterilizer is not allowed to cool down so that basically the cleaning action is accomplished by the alternation of hot alkaline detergent and hot phosphoric acid. Insofar as concerns the dairy and dairy equipment (usually stainless steel), such a cleaning cycle is efficient. Any fats in or on the dairy equipment are liquefied, saponified and removed by the hot alkaline wash. Calcium deposits are sequestered and removed by the hot phosphoric acid wash.

However such standard cleaning cycles, e.g. C.I.P. and HTST cycles, involve somewhat extreme pH conditions, such as for example pH 2-3 for the acid wash and pH 12-13 for the alkaline wash, with concommitantly relatively high mineral matter loading in the wash waters e.g. 0.5-2 ounces per gallon, roughly 10 g/l. The local sewage disposal plant must dispose of the nutrients in the wash waters, and the sewage plant effluent adds a significant mineral matter loading to downstream surface waters.

The importance of cleanliness in the dairy industry is such that dairies are largely exempt from the full force and effect of environmental statutes and regulations that would otherwise prohibit discharge of highly alkaline and highly acidic effluents into sewage disposal systems. The microorganisms in those sewage disposal systems receiving dairy effluents, are subject to a highly alkaline pH, and to a highly acid pH in rapid alternation, the latter including large quantities of phosphorous nutrient. In consequence, malfunctions often occur in the aerobic digesters of the sewage disposal systems. Indeed a significant tendency has been established for municipalities, one by one, to decline the responsibility for handling sewage effluent from the local dairy. More and more the dairy operator must accept the full responsibility for treatment of the dairy effluent. Yet the problem described above is exacerbated when the load of the sewage disposal system is almost entirely effluent from a dairy, and such is inevitably the case when a large dairy has been forced to provide its own sewage disposal system.

The object of the present invention is to provide an easily disposed of cleaning solution for dairies.

A further object of the present invention is to provide a cleaning procedure adopted to the removal of milk stone and other milk deposits from inside of dairy equipment.

THE INVENTION

Briefly stated, the present invention contemplates cleaning dairy equipment and notably dairy pasturizers with an aqueous cleaning solution containing therein a non-foaming anionic or non-ionic detergent, 0.5-2.5 g/l of sodium carbonate and sodium bicarbonate, and an alkaline proteinase. For hard water areas, sodium tripoly phosphate may be included in amounts of up to 1.25 g/l.

Desirably, the detergent, proteinase, carbonates and phosphate, when used, are supplied as a premixed particulate composition.

Such a cleaning solution can be pumped through the dairy equipment, including the sterilizer, at from ambient to 55° C., preferably at from 35°-50° C. to clean with very high efficiency. In fact, the cleaning efficiency is comparable to the results obtained by the alternating alkaline and acid washes heretofore employed.

The cleaning solution and the dry mixture composition are believed to be novel.

DISCUSSION OF THE INVENTION

As has already been pointed out, the composition of this invention may be formulated as a dry powder mix. Each of the components thereof are available commercially in solid powder form. Accordingly, the composition can be provided in bulk so that the dairymen need only add a weight of the composition appropriate to the quantity of cleaning solution necessary for the equipment, and then clean the equipment as has been done heretofore, i.e., pre-rinse clean and rinse, with care, however, being taken to insure that the cleaning solution in contact with the equipment is kept within the temperature range of ambient to 55° C., i.e., reduce the sterilizer's temperature. A moderately elevated cleaning temperature range of 35°-55° C. enhances the enzymatic activity, and helps to liquefy fats. On the other hand, temperatures above about 55° C. are to be avoided, for they result in rapid enzyme deactivation. In a word, the sterilizer must not be left at operational temperature levels during cleaning.

It may be noted that, if the quantities of sodium carbonate and sodium bicarbonate herein employed do not have sufficient sequestering capabilities to handle the quantity of calcium ions in the lactaceous deposits and in the water supply of the dairy, then the composition should include an appropriate proportion of sodium tripolyphosphate therein; 1.25 g/l is about the upper limit for hard water sites.

It is noteworthy that the pH 8.5-11.5 attained in the cleaning solution when the composition is added thereto at 1-2.5 g/l is sufficiently alkaline to saponify any fats present in the milkstone deposits on the dairy equipment. The proteins in milk deposits are, of course, digested enzymatically and become dissolved in the cleaning solution.

The high level of cleaning efficiency attained by practice of this invention is obtained with a cleaning solution effluent considerably reduced in mineral content, in pH swings and in phosphorous nutrient content (even at hard water sites). In consequence, the operating parameters of the sewage disposal plant are much improved. In addition, the mineral salt loading in the effluent from the sewage disposal system is much reduced.

In order to minimize the load on sewage disposal systems, the carbonate content of the cleaning solution is maintained very near to the content required for pH adjustment to the pH 8.5–11 desired for saponifying the fat content of any lactaceous deposits in the dairy equipment. The sodium tripolyphosphate, when employed, is present only in the quantities required to sequester calcium, e.g., dissolve water stone, and chelate calcium released from calcium caseinate. The enzyme, employed in relatively high proportions to be certain that all (refractory) deposits of milkstone dissolve, is the crucial ingredient for high cleaning efficiency. When enzyme concentration is decreased below 1 mg% (i.e. 1 mg/100 ml) cleaning efficiency is sharply reduced.

The anionic or non-ionic detergent is present in the cleaning solution in the same small but effective amounts as has been used heretofore (in the alkaline cleaning wash), and therefore neither the detergent material, nor its relative proportions in the solution need be discussed.

PREFERRED PRACTICES OF THE INVENTION

As has been pointed out above, the pre-mixed composition of the present invention includes sodium carbonate and sodium bicarbonate in a 1:5 to 3:1 ratio, a non-ionic or anionic detergent, an alkaline proteinese and, optionally, sodium tripolyphosphate all in the following proportions, in part by weight carbonates (combined)—100
detergent (100% active basis)—5–30
alkaline proteinase—1–100
sodium tripolyphosphate—0–125

To repeat, this composition is intended to be dissolved in water in the relatively low concentrations of 1–2.5 gm/liter to form a dairy cleaning solution adapted to remove milkstone and other lactaceous deposits from dairy equipment.

As has already been pointed out, the detergent material is present in essentially the same small but effective amounts as in prior art cleaning solutions and, in fact, may be the same non-ionic or anionic detergent materials used heretofore serving, in fact, the same purpose as before. It may be noted, however, that the mineral matter content of the pre-mixed composition is so reduced, that the detergent proportion may be surprisingly high, e.g., nearly 30% w/w, yet still represent only 0.03% w/v of the cleaning solution.

No chemical basis can be given for preferred detergents. The detergent art is old and highly advanced. Virtually hundreds of known materials constitute (suitable) detergents of an anionic and non-ionic character, even when the present intended use specifies also that the detergent should not create foam and that the detergent be biodegradable. Many commercially available detergents are suited to the formulation of embodiments of the present composition. (See for example, the lists provided in *Systematic Analysis of Surface-Active Agents,* 2d Edition, Rosen et al, Wiley-Interscience). Suffice it then to repeat that the chemistry of the detergent material forms no part of this invention, that the quantity of detergent incorporated in the formation will depend upon the characteristics of the particular detergent selected and that in all events the quantity of detergent in the wash solution will be little more than is necessary for detergent purposes. In other words, a small but effective amount of anionic or non-ionic detergent is contemplated as forming part of the present cleaning solution. The detergents herein described or referenced should be considered as only exemplary of the many commercially available detergent materials adapted for practice of this invention. A preferred detergent is TRITON X-100 and the small but effective amount, herein above described, would be approximately 25% be weight of the mixture. In general the detergent would range from 10–35% w/w of the total composition.

The enzyme too must be described in functional terms as an alkaline proteinase. Fortuitously, several alkaline proteinases are available commercially, e.g., Alcalase ®, Esperase ®, Maxatase ®.

Specifically, any detergent enzyme is suitable for practice of this invention, detergent enzyme being identifiable as the proteolytic enzymes customarily incorporated into powder household detergents. The great bulk, and perhaps all of the detergent enzymes employed heretofore, have been the alkaline proteinase elaborated extracellularly by selected strains of *B licheniformis.* They are available in dust free forms, adapted as much for admixturn into household detergents. Specifically preferred are the proteinases available under the brand names "Alcalase" and "Maxatase". However, many alkaline proteinases suitable for employment in the practice of this invention have been described in literature, with some, e.g., "Esparase", being available commercially. Suffice it then to say, that any akaline proteinase can be employed in practice of this invention, but the commercially established detergent proteinases are preferred for use in embodiments of this invention.

The concentration of alkaline proteinase contemplated is from about 1–100 milligram percent w/v, i.e., 1–100 milligrams of enzyme per hundred milliliters of cleaning solution preferably from 2–20 mg% w/v based on an enzymatic activity of 1.5 Anson Units per gram or 4.0 KNP Units/gm. whichever measurement is appropriate to the enzyme. The quantity of enzyme present in the cleaning solution according to the present invention is much higher than the proportions normally employed in household detergent formulations.

Tests indicate that the cleaning efficiency of the enzyme is a function of time, temperature and enzyme concentration. Significant cleaning is obtained with as little as 0.1 milligram percent; but the cleaning efficiency increases substantially as enzyme content increases in the 0.1–1 milligram percent w/v range and approaches 100% in the 1–2 mg% w/v range. However, as enzyme content varies in the 2–100 milligram percent w/v range the cleaning efficiency remains relatively constant at close to 100%. The range of 2–20 mg% w/v is therefore the preferred range for enzyme concentration according to practice of the present invention.

Normally the component of the composition in highest proportion constitutes a mixture of sodium carbonate and sodium bicarbonate, the two being in proportions of from 1:5 to 3:1. As has been indicated the total quantity of carbonates employed is adequate to provide a pH in the range pH 8.5–11 for the cleaning solution. A preferred carbonate mixture is sodium sesquicarbonate i.e. the molar 1:1 co-crystallization mixture of sodium carbonate and sodium bicarbonate, and use of sodium sesquicarbonate in concentration of 2.5 grams per liter of water will make the pH of the solution pH 10.2. In the cleaning solution, the carbonates content will generally be 1–2.5 gm/l, or restated 0.1–0.25% w/v.

Since the composition of the present invention and its employment in dairy cleaning solutions is predicated upon the concept of cleaning through enzymatic action and minimizing the mineral salts loading in the cleaning solution, the pre-existing minerals hardness of the cleaning water becomes significant to practice of this invention. Accordingly, the optional presence of sodium tripolyphosphate is contemplated in the composition of the present invention whenever the dairy cleans with hard water. When used, the sodium tripolyphosphate will constitute 10–50% w/w of the composition. Moderately soft water will require only about 10%, and moderately hard water about 20%, but very hard water nearly 50% w/w of the sodium tripolyphosphate. In very hard water areas, 1.25 g/l, or, restated 0.125% w/v, of sodium tripolyphosphate should be present in the cleaning solution to sequester the calcium ions and prevent formation of scale or water stone in the dairy equipment.

For further understanding of this invention reference is now made to the following specific examples thereof.

EXAMPLE 1

A detergent base was formulated in the following proportions per 100 ml of deionized water. 0.050 gm soda ash, 0.050 gm $NaHCO_3$, 25 gm Triton X-100 (a tertiary octyl phenol terminated polyethylene oxide, the polyethylene oxide has a degree of polymerization of 9 or 10). This solution of pH—10.2, was employed to formulate cleaning solutions with 0.1–100 mg% w/v of an alkaline proteinase of 1.5 Anson Unit/gm activity. (Alcalase P—1.5)

A laboratory pasturizer was operated under conditions comparable to the conditions of large scale dairy pasturizers for high temperature short time pasturization (HTST), with a temperature rise in the milk from 40° F. to 170° F. in 13 seconds and maintenance of the milk at 170° F. for 16.1 seconds. The operating conditions produced a lactaceous deposit inside the pasturizer.

Cleaning efficiencies were estimated by using the calcium content of the milk as a tracer. The quantity of calcium removed by the cleaning solution and the calcium removed by a subsequent hot nitric acid wash were taken as representing the total amount of milk residue, and the fraction removed by the cleaning solution computed out as the cleaning efficiency.

The cleaning technique was to first rinse out the pasturizer at room temperature with deionized water (twice for 50 minute rinse contact time), then to clean by passing enzyme solution through for 25 minutes at 45° C. (113° F.), followed by a nitric acid rinse at 78° C. (172° F.) (twice for 50 minute contact time). The results are tabulated below:

| Proteinase Concentration mg/100 ml | Cleaning Efficiency % |
| --- | --- |
| 100 | 95 |
| 100 | 90 |
| 10 | 89 |
| 10 | 68 |
| 10 | 100 |
| 2 | 94 |
| 1 | 99 |
| 1 | 91 |
| 0.1 | 32 |
| 0.1 | 34 |

EXAMPLE 2

The pasturizer of a small dairy was used to treat 600 pounds of milk over a two-hour period, then was cleaned with 25 gallons of the cleaner solution of Example 1 containing 2 mg% Alcalase P—1.5 at 96°–115° F. for 45 minutes.

After the cleaning treatment the heater exchanger of the pasturizer was opened up and examined for presence of lactaceous deposits. The inside surfaces were found to be clean and devoid of deposits.

What is claimed:

1. A method for cleaning dairy equipment which comprises treating the dairy equipment with a pH 8.5–11 aqueous cleaning solution consisting essentially of a non-ionic or anionic detergent, and from 0.5–2.5 grams per liter of sodium carbonate and sodium bicarbonate in a 1:5 to 3:1 ratio and from 0.01 to 1 gram per liter of an alkaline proteinase based upon an enzymatic activity of 1.5 Anson Units per gram or 4.0 KNP Units/gm whichever measurement is appropriate to the enzyme, and from zero to 1.25 grams per liter of sodium tripolyphosphate at a temperature range of from ambient to 55° C.

2. The method of claim 1 wherein the temperature of the cleaning solution is in the range of 35° C.–50° C.

3. A cleaning solution adapted for cleaning dairy equipment of milk derived deposits which consists essentially of water, a non-ionic or anionic detergent, from 0.5–2.5 grams per liter of sodium carbonate and sodium bicarbonate in a weight ratio of 1:5 to 3:1, from 0.01–1 gram per liter of an alkaline proteinase based upon an enzymatic activity of 1.5 Anson Units per gram or 4.0 KNP Units/gm whichever measurement is appropriate to the enzyme, and from zero to 1.25 grams per liter of sodium tripolyphospate, said cleaning composition having a pH of pH 8.5–11.

4. A composition adapted for admixture with water to form a dairy cleaning solution consisting essentially of sodium carbonate, and sodium bicarbonate in a 1:5 to 3:1 by weight ratio, a non-ionic or anionic detergent, from 1–100 parts of an alkaline proteinase based upon an enzymatic activity of 1.5 Anson Units per gram or 4.0 KNP Units/gm whichever measurement is appropriate to the enzyme, per 100 parts by weight of the carbonates and from zero to 125 parts by weight of sodium tripolyphosphate per 100 parts by weight of the carbonates.

5. The composition of claim 4 wherein the proteinase content is from 2–20 parts per 100 parts by weight of the carbonates.

* * * * *